United States Patent

[11] 3,592,149

| [72] | Inventors | Reinhold Mutke<br>Erkrath-Unterbach;<br>Peter Steller, Dusseldorf, both of, Germany |
|---|---|---|
| [21] | Appl. No. | 861,088 |
| [22] | Filed | Sept. 25, 1969 |
| [45] | Patented | July 13, 1971 |
| [73] | Assignee | Vereinigte Kesselwerke Aktiengesellschaft<br>Dusseldorf, Germany |
| [32] | Priority | July 16, 1969 |
| [33] | | Japan |
| [31] | | 44/55787 |

[54] APPARATUS FOR PROCESSING SEWAGE
13 Claims, 3 Drawing Figs.

[52] U.S. Cl. ............................................. 110/7, 110/15
[51] Int. Cl. ............................................. F23g 5/00
[50] Field of Search ............................................. 110/7, 8, 8 P, 15, 18, 22

[56] References Cited
UNITED STATES PATENTS

| 2,094,909 | 10/1937 | Baily et al. | 110/8 X |
| 3,322,079 | 5/1967 | Komline et al. | 110/8 |
| 3,413,937 | 12/1968 | Bojner et al. | 110/8 X |
| 3,489,108 | 1/1970 | Garver et al. | 110/7 |

*Primary Examiner*—Kenneth W. Sprague
*Attorney*—Michael S. Striker

ABSTRACT: Apparatus for drying sewage with a high liquid content comprising a flue duct for conducting hot flue gases from a combustion furnace along a predetermined path and in which at least one atomizer is arranged for injecting sewage into the hot flue gases passing through the flue duct. Baffle means are provided in the flue duct after the atomizer for mixing the hot flue gases with the sewage injected therein to thereby dry the substantially liquid sewage and simultaneously cool the hot flue gases.

3,592,149

1

APPARATUS FOR PROCESSING SEWAGE

BACKGROUND OF THE INVENTION

The invention relates to an apparatus for drying sewage having a liquid content of 90 percent or more.

It is known in the art to mechanically dehydrate or concentrate liquid sewage by means of filter presses, vacuum filters, centrifuges and similar apparatus. The result of such methods, on the whole, depends on the condition of the sewage treated. Usually additional substances have to be added to the sewage or the sewage has to be preheated, with the result that such methods become complicated and expensive.

In addition, the expenditure for such apparatus as well as the expenses involved for the maintenance and the operation thereof, are considerably high while, furthermore, the problem exists that the liquid separated from the sewage, has to be further processed.

Further known are thermic methods for drying liquid sewage. Such methods utilize rotating drums or multiple-stage dryers in which the liquid sewage is deposited and flue gases are conducted therethrough to dry the sewage.

Such apparatus comprise a combustion furnace whose flue gases in part are used to dry the liquid sewage and in part are used to heat the sewage vapors in a heat exchanger, which thus heated sewage vapors are subsequently conducted to the combustion chamber of the furnace in order to be burned.

All these methods and apparatus have the common disadvantage that only highly concentrated sewage can be treated.

In addition, such apparatus are susceptible on the one hand to trouble as a result of their moving parts and on the other hand to considerable wear during operation as a result of the influence of heat and corrosion.

SUMMARY OF THE INVENTION

Object of the invention is to provide an apparatus for drying sewage having a high liquid content of 90 percent or more.

Another object of the invention is to provide an apparatus for drying liquid sewage which avoids the complicated and expensive method of initially and highly concentrating the liquid sewage before drying the same.

A still further object of the invention is to provide an apparatus which in a most simple and hygienic manner disposes of sewage and similar liquid containing refuse.

Such an apparatus according to the present invention comprises a flue duct cooperating with a source of hot flue gases to conduct these gases along a predetermined path and in which at least one injecting member is operative to inject substantially liquid sewage into the hot flue gases passing through the flue duct. Mixing means are provided after the injecting member to mix the hot flue gases with the sewage injected therein to thereby dry the liquid sewage and simultaneously cool the hot flue gases.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

2

DESCRIPTION OF THE PREFERRED EMBODIMENTS

Figures 1, 2:
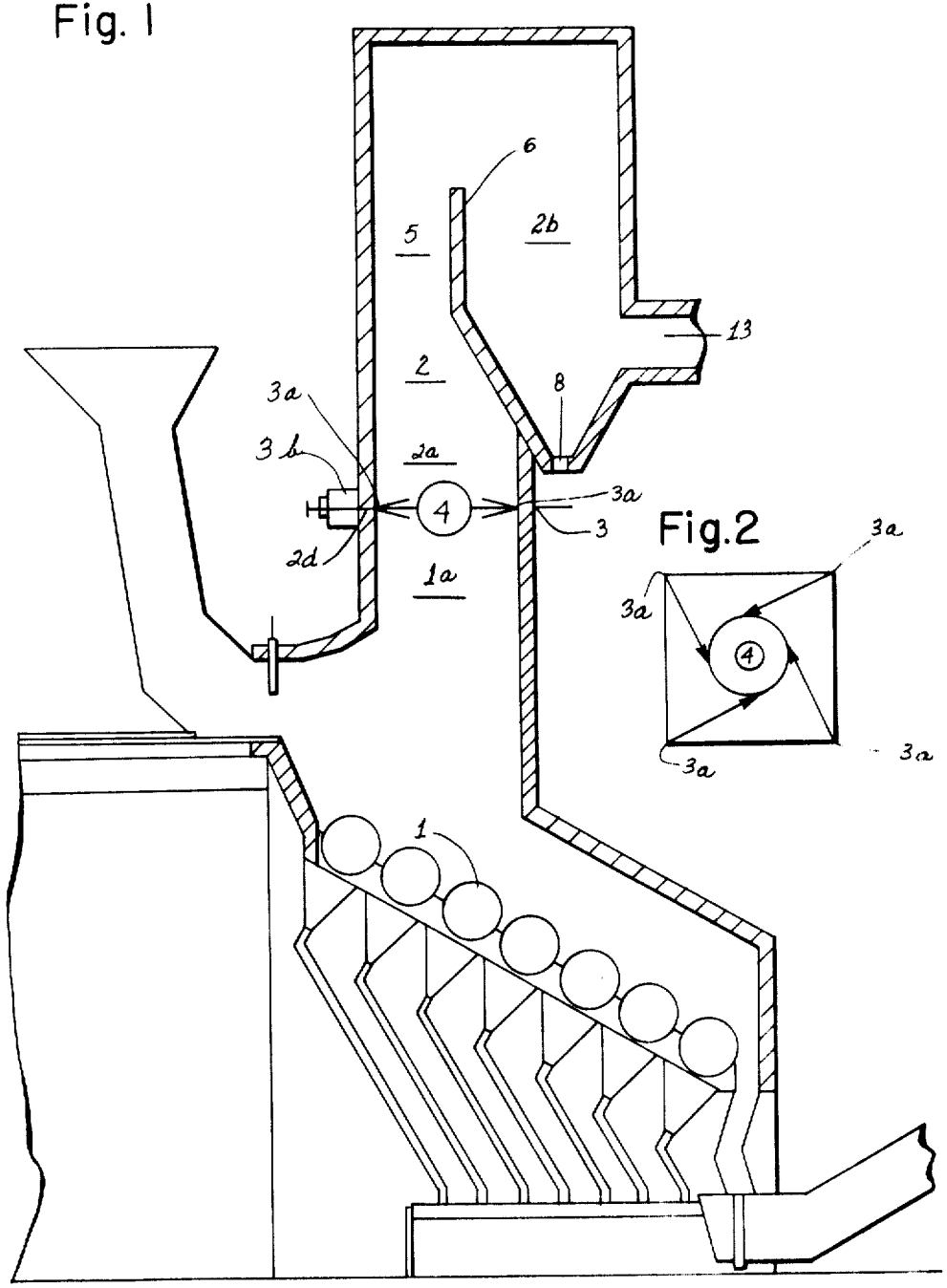
FIG. 1 shows a cross-sectional view of a drying apparatus for substantially liquid sewage according to the present invention.
FIG. 2 shows a view illustrating a preferred arrangement of injecting the substantially liquid sewage into the apparatus of FIG. 1.

Referring now to the drawings in which like reference numerals index like parts, FIG. 1 illustrates a preferred embodiment of an apparatus for drying substantially liquid sewage with a liquid content of 90 percent or more, and which is seen to comprise a combustion furnace 1 in which refuse or other solid-type garbage is burned. Directed upwardly from the furnace 1 and communicating with its upstream end 1a thereof, is a flue duct 2 operative to conduct the flue gases resulting from burning the rubbish or garbage in the furnace, along a predetermined path.

The duct 2 has an upstream portion 2a and a downstream portion 2b. The distance between the upstream portion 2a and the combustion furnace 1 is arranged so that the former receives combusting flue gases from the furnace and lies substantially beyond the area of the flames and fire of the furnace 1.

The upstream portion 2a lies at a distance relative to the furnace 1 such that it receives combusted flue gases from the furnace.

Arranged substantially in the upstream portion 2a, is an atomizing injecting arrangement 3 including at least one atomizer 3a operative to selectively inject substantially liquid sewage into the stream of hot flue gases passing through the flue duct 2.

To this end, the atomizer 3a has a nozzle portion, not shown, which opens into the flue duct 2 via a wall 2d thereof.

The atomizer 3a is suitably arranged with a mechanical switch 3b which is operative to establish or halt the injecting operation of the atomizer.

In the preferred embodiment and as shown in FIG. 2, the inner surface of the upstream portion 2a of the flue duct 2 preferably has a polygonal surface with four sides and four corners and instead of one atomizer, four atomizers 3a are employed and are arranged so that each of them is arranged in a corner of the four-sided polygonal surface.

In this configuration, the four axes of the outlet nozzles of the atomizers 3a are oriented substantially tangentially with respect to an imaginary circle 4 which is representative of the flow axis of the stream of hot flue gases passing through the flue duct 2. Also shown, the atomizers 3a are arranged such that their axes are oriented in one and the same circumferential direction relative to the flow axis of the stream of hot flue gases.

In this manner, the symmetrically arranged atomizers 3a serve to effectively and uniformly cool the hot flue gases.

In order to prevent wear and clogging or obstruction of the atomizer nozzles as a result of the solid particles contained in the substantially liquid sewage, so-called rotatable injectors are used which have a substantially large cross-sectional area as regards the passage defined therethrough.

However, it will be appreciated that any other type of injecting or atomizing means may be used to inject or spray the sewage into the stream of hot flue gases in an overall uniform manner.

Also, the arrangement of locating the atomizers in the flue duct 2 upwards of the furnace 1 and in the stream of the upwardly conducted hot flue gases, has the advantage that large solids of the sewage will remain in the stream of hot flue gases for a longer period than the smaller solids of the sewage, this as a result of the fact that the upward speed of the hot flue gases opposes the falling speed of the large solids which keeps these larger solids floating till they are substantially dried.

In case the weight of some solids in the sewage is too high and their falling speed exceeds the upward speed of the hot flue gases, such solids will fall down through the duct 2 and into the furnace 1 to be burned there.

Also, instead of positioning the atomizers 3a in the above manner, two or more atomizers may be arranged in opposite wall portions of the flue duct 2, provided they are directed into the stream of hot flue gases in such a manner that an overall uniform and substantial drying of the sewage is achieved.

At the same time and as a result of injecting the sewage into the stream of hot flue gases, the temperature of these flue gases should be uniformly decreased so as to avoid variations of temperatures of these gases which, in case such gases are too hot, may lead to malfunctioning of the atomizers 3a and, in case such gases have too low a temperature, cause corrosion and even deposit of water in the duct 2.

To this end, a baffle 6 is provided downstream of the upstream portion 2a in the flue duct 2. The baffle 6 constricts the stream of hot flue gases and the sewage injected therein so as to locally increase the speed of the same. Directly following the baffle and as a result thereof, the flue gases are abruptly deflected through an angle of 180° into the downstream portion 2b of the flue duct 2 which has a diameter larger than the upstream end portion 2a. This abrupt deflection of the stream of hot flue gases and the injected sewage, in combination with the initial constriction thereof, causes heavy turbulence of the same to thereby effect a thorough intermixing of the hot flue gases and the sewage in downstream portion 2b and, as a result, the substantially liquid sewage is fully dried by the hot flue gases while the latter are cooled by the substantially liquid sewage.

At this stage, and as a result of the reduced speed of the hot flue gases due to the abrupt 180° deflection into the wider cross section 2b of the duct 2 following their initial constriction by baffle 5, already a substantial part of dried solids is separated from the sewage and automatically disposed of via an outlet passage 8 at the lowermost end of downstream portion 2b. Outlet passage 8 may communicate either with a collecting reservoir, not shown, or may communicate with the furnace 1 where it is subsequently burned.

The remainder of the sewage is conducted through an outlet 13 again to a reservoir or to the furnace 1.

The flue gases, at this time, are cooled to such an extent, that they too are conducted out of the installation and safely released into the atmosphere.

Figure 3:
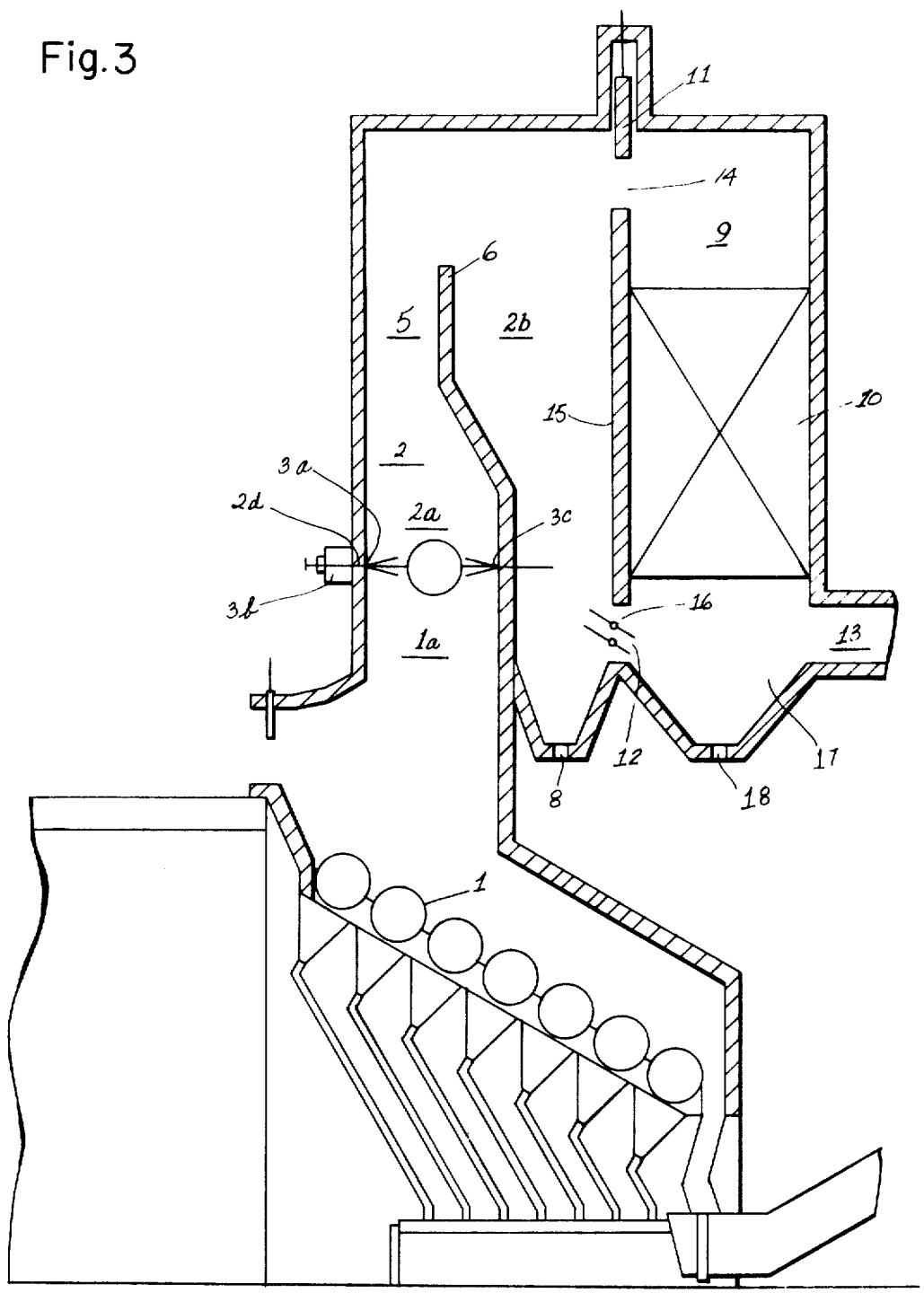
FIG. 3 shows a cross-sectional view illustrating a further embodiment of the apparatus of FIG. 1.

Shown in FIG. 3 is the arrangement and embodiment of FIG. 1, however including a heat exchanger 10 located in a further duct portion 9 which extends parallel with duct portion 9 which extends parallel with duct portion 2b downstream in the apparatus.

The duct portion 9 communicates with duct portion 2b via an opening 14 and is separated from duct portion 7 by means of a wall 15. The opening 14 is closed by a valve member 11 during injecting operation of the atomizers 3a so that the stream of hot flue gases and the sewage mixed therewith, bypasses the duct portion 9 and, via the duct portion 2b, an opening 16 and a further duct portion 17, are expelled from the apparatus via outlet 13.

In case the atomizers 3a are inoperative, i.e. are deactivated by the switch 3b, the valve member 11 is opened while a further valve member 12 is closed. Opening of valve member 11 forces the hot flue gases emanating from the furnace 1, to pass through the duct portion 9 and via the heat exchanger 10, in which they are cooled, into the duct portion 17.

It will be seen, that in closing the valve member 12, the opening 16 is likewise closed and that, consequently, the hot flue gases are prevented from entering the duct portion 17 until they are cooled by heat exchanger 10 via duct portion 9.

The flue gases thus cooled by heat exchanger 10 are expelled from the apparatus via outlets 18 and 13 into the atmosphere.

The arrangement of cooling the hot flue gases by means of the heat exchanger instead of by the liquid sewage, is then necessary when, for example, the atomizers 3a are to be cleaned or repaired, in which condition no injection of the sewage takes place.

Disconnection of the atomizers 3a is also then necessary when the flue duct portion 2a is to be cleaned, in which condition the hot flue gases heat this portion to combustion room temperatures to burn internal deposits in the duct.

The additional arrangement of the heat exchanger 10 is quite advantageous in those cases where heat exchange is necessary to heat additional installations or buildings.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What we claim as new and desire to be protected by Letters Patent is set forth in the appended claims:

1. An apparatus for drying sewage having a high liquid content; comprising in combination, a source of hot flue gases; flue means having an upstream portion and downstream portion with the latter having a cross section at least equal to that of said upstream portion, said flue means conducting a stream of said hot flue gases along a predetermined path; injecting means selectively communicating with said flue means for injecting into said stream of hot flue gases sewage containing a liquid-solid mixture; and mixing means in said upstream portion of said flue means after said injecting means and progressively constricting the cross section of said upstream portion in direction towards said downstream portion so as to increase the flow speed of said stream and mixture and induce turbulence therein on entry into said downstream portion for intimately mixing the injected sewage with said stream of hot flue gases to thereby dry the liquid contents of said injected sewage and to simultaneously cool said stream of hot flue gases.

2. An apparatus as defined in claim 1, wherein said upstream portion and downstream portion communicate with said baffle means upstream and downstream thereof, said downstream portion extending angularly relative to said upstream portion and said baffle means operative to abruptly change the direction of flow of said injected sewage between said upstream and downstream portions of said flue means to effect said turbulence and thereby said intimate mixing of said stream of hot flue gases and said injected sewage in said downstream portion of said flue means.

3. An apparatus as defined in claim 2, wherein said downstream portion of said flue means has a larger diameter than said upstream portion thereof.

4. An apparatus as defined in claim 3, wherein said downstream portion of said flue means extends at an angle of 180° relative to said upstream portion thereof.

5. An apparatus as defined in claim 4, wherein said flue means is a tubular member, and wherein said injecting means includes at least one atomizing injecting member having a nozzle portion opening in said tubular flue member for dispensing said sewage into said stream of hot flue gases passing through said tubular flue member.

6. An apparatus as defined in claim 5, wherein said injecting means includes a plurality of atomizing injecting members having their nozzle portions opening at inner opposite wall portions of said tubular flue member.

7. An apparatus as defined in claim 5, wherein said tubular flue member has an inner polygonal circumference, and wherein said injecting means includes a plurality of atomizing injecting members arranged along said inner polygonal circumference of said tubular flue member.

8. An apparatus as defined in claim 7, wherein said plurality of atomizing injecting members have outlet orifices whose respective axes are oriented substantially tangentially with respect to the flow axis of said stream of hot flue gases.

9. An apparatus as defined in claim 8, wherein said stream of hot flue gases has an axis extending in the direction of flow of said gases, and wherein said axes of all of said outlet orifices are oriented in one and the same circumferential direction relative to said axis of said stream of hot flue gases.

10. An apparatus as defined in claim 7, wherein said inner polygonal circumference of said tubular flue member is quadrangular, and wherein each one of said plurality of atomized injecting members is located in each one of the angles of said quadrangular circumference.

11. An apparatus as defined in claim 5, wherein said injecting means includes disconnect means for selectively halting sewage-dispensing operation of said at least one atomizing injecting member, and wherein said flue means includes heat exchange means after said mixing means in said downstream portion of said flue means for cooling said stream of hot flue gases following halting of said sewage-dispensing operation of said at least one atomizing injecting member.

12. An apparatus as defined in claim 11, wherein said downstream portion of said flue means includes outlet means, a first normally open passageway normally communicating with said outlet means for the disposal of dried sewage and cooled flue gases, and a second normally closed passageway accommodating said heat exchange means and operative to communicate with said outlet means for the disposal of flue gases cooled by said heat exchange means, said first and second passageways extending substantially parallel relative to each other and having valve means for selectively closing said first normally open passageway and opening said second normally closed passageway in response to halting of said sewage dispensing operation of said atomizing injecting member.

13. An apparatus as defined in claim 1, wherein said source of hot flue gases is a combustion furnace, and wherein said flue means is a duct member having an inlet and an outlet, said inlet having said upstream and downstream portion, said upstream portion communicating with and receiving combusting flue gases from said combustion furnace and said downstream portion communicating with said upstream portion for receiving from the latter combusted flue gases, and wherein said injecting means is located in said downstream portion of said inlet upstream of said mixing means.